Patented Apr. 9, 1946

2,398,069

UNITED STATES PATENT OFFICE 2,398,069

ANTIFOULING COMPOSITION

George H. Young, Pittsburgh, Pa., assignor to Stoner-Mudge, Inc., Pittsburgh, Pa., a corporation of Pennsylvania No Drawing. Application February 12, 1943, Serial No. 475,698

3 Claims. (Cl. 106—15)

This invention relates to antifouling compositions capable of application to the surfaces of structures which are subjected to submersion in sea water, for the purpose of preventing fouling by cirripede crustacea (barnacles), hydroids, bryozoa, and other marine organisms. It relates specifically to antifouling coating materials including in their composition certain non-resinous toxic condensation products derived from certain phenolic bodies and aldehydes as hereinafter fully set forth. My antifouling compositions find particular application in the protection from fouling of metal structures such as ship hulls, pier supports, and flying boat hulls and pontoons, where use of prior-art copper—and mercury—containing antifouling paints results in deleterious galvanic corrosion due to the electrochemical activity of dissimilar metals in contact. It will, however, be understood that they are equally applicable to non-metallic surfaces.

In U. S. Patent 2,287,218, issued June 23, 1942, of which I am a co-inventor, there were described effective antifouling compositions consisting of "mixtures of certain phenolic compounds, certain high boiling coal tar bases, and aromatic unsaturated aldehydes, dispersed in suitable film-forming vehicles and volatile solvents." It was there disclosed that combinations of the three types of non-metallic toxic agents were generally more effective than were the single agents. The present application is a continuation-in-part of another application filed by me on March 25, 1941, and bearing Serial Number 385,079.

I have discovered that by condensing certain phenolic bodies with a mixture of aldehydes, typically formaldehyde and cinnamic aldehyde under conditions hereinafter specified, there results a non-resinous product which is strongly active against marine organisms generally, but particularly against cirripedes crustacea and bryozoa. In certain applications these toxic condensation products are more strongly lethal to marine arthropods than are the compositions of the previous invention. The reason for this superiority is not known. It may reside in the facts that my toxic condensation products are appreciably less volatile than the simple phenolic bodies from which they are derived and are thus less subject to gradual loss from the painted surface on continued exposure to the atmosphere when the surface is unavoidably out of contact with water. It may reside in a slightly increased water solubility, enabling lethal concentrations to be more rapidly established at the water-coating interface. It may reside in the presence within the molecular structure of the toxic styryl radical from the cinnamic aldehyde. Whatever the mechanism whereby they operate, antifouling coatings containing my specially derived condensation products are particularly effective, and surpass in protective ability even those prior art compositions containing copper and mercury compounds.

Not all phenolic bodies are capable of condensation with aldehydes, as is well known. I have found that suitable antifouling toxic agents can be prepared from phenolic bodies which have at least two reaction-favorable positions available in the parent phenol ring. By this, I mean that only those phenolic bodies having the structures

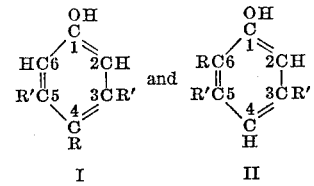

will serve my purpose. In these schematic formulae, R is selected from the group consisting of the lower alkyl radicals containing up to 6 carbon atoms, the cycloalkyl radicals containing up to 6 carbon atoms, the phenyl radical, and the halogens. R' is selected from the group consisting of hydrogen and the lower alkyl radicals containing up to 6 carbon atoms, the cycloalkyl radicals containing up to 6 carbon atoms, the phenyl radical, and the halogens. I generally prefer to use bi-functional phenolic bodies in which R' is a hydrogen atom or a halogen.

In condensing my phenolic bodies with my mixed aldehydes, the reaction is so controlled, by keeping the aldehyde/phenolic body ratio greater than 1:1, and by keeping the reaction time short and temperatures low, that the product does not progress beyond the state of being a viscous liquid or putty-like semi-solid containing from 2 to 4 phenolic nuclei bonded together with methylene and substituted units. Molecular weights do not exceed 300–900; the compounds are not film-forming, and are in no way to be confused with the resinous products of the usual condensation of phenolic bodies and aldehydes. For convenience, throughout the specification and claims I shall refer to my non-resinous toxic condensation products as "toxic condensates"; it will be clearly understood that I do not mean to include the resinous products of the usual condensation of phenols with aldehydes, and in fact, desire to specifically exclude these latter materials.

Typical bi-functional phenolic bodies which I have advantageously employed in the preparation of my non-resinous condensation products, either singly, or in combinations of two or more, are tabulated below:

o-Cresol
o-Tert. butyl phenol
o-Tert. amyl phenol
o-Cyclohexyl phenol
o-Chlor meta cresol
2,3-dichlorophenol
2,5-dichlorophenol
Thymol
3-chloro-2-phenyl phenol
p-Cresol
p-Tert. butyl phenol
p-Tert. amyl phenol
p-Cyclohexyl phenol
2,3,5-trichlorophenol
3,4,5-trichlorophenol
p-Cumyl phenol
3-bromo-2-phenyl phenol The mixture of aldehydes with which I react the above phenolic bodies consists of (A) a saturated aldehyde selected from the group consisting of formaldehyde, acetaldehyde, propionaldehyde, and the higher homologous aliphatic mono-aldehydes containing up to 7 carbon atoms including the carbonyl carbon, hereinafter identified as "saturated unsubstituted lower aliphatic mono-aldehydes"; and (B) an unsaturated aldehyde selected from the group consisting of cinnamic aldehyde together with its lower alkyl nuclear-substituted homologs. That is, at least one aldehyde from group (A), and at least one from group (B) are present. I prefer to use approximately equi-molal quantities of the two aldehydes.

A schematic formula, showing the probable structure of my condensate derived from p-cresol, formaldehyde, and cinnamic aldehyde, is as follows:

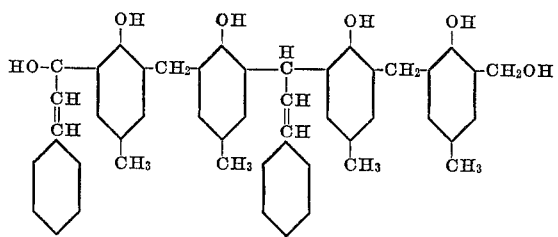

It will, of course, be understood that simpler bodies are present (typically those containing only 2 or 3 phenolic nuclei), and that for my purposes, the isolation of pure, single compounds is neither necessary nor desirable. In fact, my crude kettle products, freed from separated water, are ideally suited for direct addition as toxicants to the selected vehicle and solvent mixture.

In the preparation of my toxic condensates it is important to insure that reaction between the phenolic body and aldehydes does not proceed to the point where incipient resinification may take place. To this end I employ an excess of aldehydes, usually 1.1 to 1.8 moles of aldehyde per mol of phenolic body, and select a catalyst concentration which does not exceed 5 per cent of the weight of phenolic body. The catalyst may be either acidic or basic, and is typically an organic acid of the sulfonic acid type, or a base such as ammonia, sodium or potassium cyanide, ammonium carbonate, triethanol amine, morpholine, aniline or hexamethylene tetramine. I have found ammonia to be a particularly advantageous catalyst for yielding toxic condensates of desirably low molecular weight. Finally, I stop the reaction short of a heavily bodied or insoluble product; with most bi-functional phenolic bodies and a mixture of formaldehyde and cinnamic aldehyde the optimum reaction time lies between 6 and 18 hours, and is usually 6 to 9 hours. The reaction is best carried out at atmospheric pressure, using a vessel equipped with a suitable mechanical agitator and an efficient reflux condenser. Sufficient heat is supplied to cause mild reflux of the water phase. My condensate is easily separated from the reaction water and that which accompanies the catalyst or other reactants (particularly if formalin be used as the aldehyde) and may be dried by shaking with a suitable desiccant. The resulting products are viscous, non-crystallizable liquids which are easily and completely soluble in the usual varnish and lacquer type solvents, such as aromatic hydrocarbons, ketones, and terpenes. They possess very low but adequate water solubilities (exceeding $1\times10^{-5}$ molal but less than $1\times10^{-2}$ molal) and have sufficiently low vapor pressures to ensure practically no loss from varnish or lacquer films in which they are dispersed, even on prolonged exposure to the atmosphere.

In the choice of suitable film-forming vehicles to carry my toxic condensates as antifouling paints, I am not restricted to the oils and oleoresinous type of materials usually employed in metal-containing antifouling paints. Since my toxic condensates are soluble in varnish and lacquer solvents, I obtain a film in which the toxic reagents are actually molecularly dispersed. As a result of this I may advantageously employ resinous vehicles having substantially lower water permeabilities than dare be the case with the usual prior art compositions; consequently, my improved antifouling coatings have a substantially longer service life.

I have found that practically any organic film-forming vehicle which yields films permeable to water at a rate of not less than 10 milligrams of water per mil of film thickness per square inch per 24 hours when tested by the free film diffusion-cell method (Wray and Van Horst, Ind. Eng. Chem. 28, 1268–9 (1936)), will function satisfactorily as the film-forming carrier for my toxic condensates. While there is no fixed upper limit to the permeability of my resinous vehicles, there is manifestly no advantage in employing a vehicle which is so rapidly permeable as to permit the toxic component to be leached out in a short time. I have found that resinous vehicles having permeabilities not greater than 200 milligrams of water per mil of film thickness per square inch per 24 hours are generally adequate for my purpose, though I prefer vehicles of permeability in the range of 25 to 130.

I find that the so-called "short-oil varnishes" from cumarone resins having oil lengths of 5–15 gallons, the oil being typically linseed, tung, oiticica, or mixtures of these, are excellent carriers for my toxic condensates. For certain special applications, as to flying boat hulls and pontoons, it may be advisable for other reasons to employ a varnish or lacquer based on non-oil-containing film-forming substances of the polyvinyl chloride, polyvinyl chloride-acetate, chlorinated rubber, cellulose ester, polymethyl methacrylate, or cellulose ether type. I may also advantageously employ as vehicles the resins derived from condensation of polybasic acids with polyhydric alcohols (with or without oil modification), rosin, ester gum varnishes, urea-formaldehyde condensation products, phenolic spar varnishes, cyclo- and dicyclo-pentadiene resins, and similar resins of the greatest diversity and variety.

For the sake of simplicity I shall throughout the specification and claims refer to these vehicles as "permeable organic film-forming vehicles," and it will be understood that I mean to include any organic coating material having a permeability rate of 10 to 200 milligrams of water per mil of film thickness per square inch per 24 hours when tested by the previously cited diffusion-cell method.

While my antifouling compositions may advantageously be employed as clear lacquers or varnishes, they may be pigmented in the usual manner with the familiar dyes and pigments. My antifouling compositions containing aluminum powder as pigment are excellent for coating flying boat hulls and pontoons. My antifouling compositions pigmented with zinc dust or with zinc chromate are particularly satisfactory for use on aluminum or magnesium alloys since such pigments are corrosion inhibitors in this case, and the resulting pigmented compositions are equally protective against corrosion and fouling.

There is no fixed limitation upon the amount of toxic component which may be incorporated with the film-forming vehicle; there is, however, a practical upper limit in that too great an addition may yield films which are soft, non-adherent, and easily damaged. Similarly, there is a practical lower limit to the amount of toxic component which should be added. While my experiments indicate that as little as 5 per cent by weight of toxic component imparts some antifouling properties, I prefer to employ from 15 to 50 per cent by weight, based on the total nonvolatile content of the formulation.

The following examples will serve to illustrate my invention, it being understood that I am not limited to the specific materials there described, nor to the specific compositions given.

Example 1

*Preparation of toxic primary condensation product*

To 1 mol of 3-chloro 2-phenyl phenol were added 0.9 mole of formaldehyde (added as a 40% solution of formalin in water), 0.9 mol of cinnamic aldehyde and 10 grams of concentrated ammonia, the whole being contained in a flask fitted with a thermometer, a refluxing condenser, and a mechanical agitator, and mounted in an oil bath. The mixture was brought to steady reflux and maintained for a total of 9 hours. The resulting viscous liquid condensation product was separated from the overlying water layer and dried.

*Typical antifouling composition*

30% cumarone varnish solids
    8 gallon oil length containing
        50% tung oil
        50% linseed oil
20% toxic component
50% mixed solvent consisting of:
    60% xylol
    10% dipentene
    30% mineral spirits This preparation was applied as a clear varnish, and showed excellent antifouling properties—particularly against barnacles and hydroids.

Example 2

*Preparation of toxic primary condensation product reactants* p-Cresol, 1 mol
Acetaldehyde, 0.6 mole
o-Methyl cinnamic aldehyde, 0.8 mole
Aq. NH$_3$ (30%), 15 grams
Reaction time: 12 hours at reflux.

*Typical antifouling compositions*

15% medium viscosity ethyl cellulose
5% toxic component
80% mixed solvent consisting of:
    50% butyl acetate
    30% methyl isobutyl ketone
    20% xylol This composition was pigmented with 1½ pounds per gallon of aluminum powder grade Albron 422, and showed excellent antifouling properties.

Example 3

*Preparation of toxic primary condensation product reactants*

3-chloro 2-phenyl phenol, 1 mol
Formaldehyde, 1.1 mole
Cinnamic aldehyde, 0.7 mol
Benzene sulfonylchloride, 5 grams
Reaction time: 8 hours at reflux.

*Typical antifouling composition*

25% phenolic varnish solids
    33 gallon oil length on Bakelite BR–254 (a
        p-phenyl phenol, HCHO oil soluble resin)
        60% tung oil
        40% linseed oil
25% toxic component
50% mixed solvent consisting of:
    80% mineral spirits
    10% xylol
    10% dipentene The above clear toxic-containing vehicle was pigmented with a 25/75 mixture of zinc chromate and iron oxide at a pigment-varnish solids ratio of 65/35, all figures by weight. Excellent corrosion protection over steel together with efficient antifouling performance resulted.

Example 4

*Preparation of toxic condensation product reactants* o-Cyclohexyl phenol, 1 mol
p-Methyl cinnamic aldehyde, 0.6 mol
Butyraldehyde, 0.6 mol
Triethanolamine, 5 grams
Reaction time: 15 hours at reflux.

*Typical antifouling composition*

The same composition as that of Example 2.

I claim as my invention:

1. An antifouling composition comprising (1) a toxic component which is a non-resinous condensation product of (a) a bifunctional phenolic body responding to the formulae

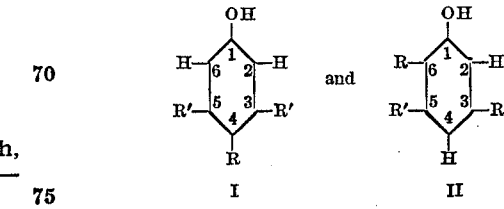

in which H is hydrogen, R is selected from the group consisting of the lower alkyl radicals containing up to 6 carbon atoms, the cycloalkyl radicals containing up to 6 carbon atoms, the phenyl radical, and the halogens, and R' is selected from the group consisting of hydrogen, the lower alkyl radicals containing up to 6 carbon atoms, the cycloalkyl radicals containing up to 6 carbon atoms, the phenyl radical, and the halogens; (b) a saturated unsubstituted lower aliphatic mono-aldehyde containing no more than 7 carbon atoms; and (c) an unsaturated aldehyde selected from the group consisting of cinnamic aldehyde together with its lower alkyl nuclear-substituted homologs—said toxic component being characterized by having a molecular weight not exceeding approximately 900, and a water solubility between $1 \times 10^{-2}$ and $1 \times 10^{-5}$ molal; (2) a permeable organic film-forming vehicle having a permeability rate of 10 to 200 milligrams of water per mil of film thickness per square inch per 24 hours when tested by the free film diffusion-cell method; and (3) a solvent mixture for the whole.

2. The composition of claim 1 in which the toxic component is derived from 3-chloro 2-phenyl phenol.

3. The composition of claim 1 in which the percentage by weight of toxic component lies between 15 and 50 per cent, based on the total nonvolatile content.

GEORGE H. YOUNG.